US008266643B2

(12) United States Patent
Lockridge et al.

(10) Patent No.: US 8,266,643 B2
(45) Date of Patent: Sep. 11, 2012

(54) METHOD AND SYSTEM FOR PREMIUM CHANNEL AND PAY PER VIEW VIDEO RESELL

(75) Inventors: Terry Wayne Lockridge, Dayton, OH (US); Mike Arthur Derrenberger, Fishers, IN (US); Robert Eugene Trzybinski, Granger, IN (US)

(73) Assignee: Thomson Licensing, Boulogne (FR)

( * ) Notice: Subject to any disclaimer, the term of this patent is extended or adjusted under 35 U.S.C. 154(b) by 718 days.

(21) Appl. No.: 10/537,749

(22) PCT Filed: Dec. 2, 2003

(86) PCT No.: PCT/US03/38213
§ 371 (c)(1),
(2), (4) Date: Jun. 6, 2005

(87) PCT Pub. No.: WO2004/054226
PCT Pub. Date: Jun. 24, 2004

(65) Prior Publication Data
US 2006/0101494 A1        May 11, 2006

Related U.S. Application Data

(60) Provisional application No. 60/431,512, filed on Dec. 6, 2002, provisional application No. 60/431,276, filed on Dec. 6, 2002.

(51) Int. Cl.
*H04N 7/16* (2011.01)
(52) U.S. Cl. .................... 725/8; 725/78; 725/74; 725/31
(58) Field of Classification Search .................... 725/74, 725/78, 8, 31, 4; 705/54
See application file for complete search history.

(56) References Cited

U.S. PATENT DOCUMENTS
4,901,367 A    2/1990   Nicholson
(Continued)

FOREIGN PATENT DOCUMENTS
JP              928632         11/1997
(Continued)

OTHER PUBLICATIONS
Search Report Dated Apr. 21, 2004.
(Continued)

*Primary Examiner* — Vivek Srivastava
*Assistant Examiner* — Junior Mendoza
(74) *Attorney, Agent, or Firm* — Robert D. Shedd; Vincent E. Duffy; Michael A. Pugel

(57) ABSTRACT

The disclosed embodiments relate to a system and method for providing data in a multiple dwelling facility. The system may comprise a headend unit that receives a data stream that comprises a plurality of programs, and a multiple dwelling unit network that is adapted to receive at least a portion of the data stream from the headend unit and provide at least a subset of the plurality of programs to individual users in the multiple dwelling facility. The method may comprise the acts of receiving a data stream that comprises a plurality of programs, distributing at least a portion of the data stream to a multiple dwelling unit network, and providing access to a specific one of the plurality of programs to each of a plurality of individual users within the multiple dwelling facility via the multiple dwelling unit network depending on whether each of the plurality of individual users has met at least one predetermined condition.

18 Claims, 2 Drawing Sheets

U.S. PATENT DOCUMENTS

| | | | |
|---|---|---|---|
| 5,073,930 A | 12/1991 | Green et al. | |
| 5,231,660 A | 7/1993 | West, Jr. | |
| 5,243,647 A | 9/1993 | Parikh et al. | |
| 5,835,128 A * | 11/1998 | Macdonald et al. | 725/81 |
| 5,905,942 A * | 5/1999 | Stoel et al. | 725/78 |
| 6,057,872 A * | 5/2000 | Candelore | 725/23 |
| 6,307,939 B1 * | 10/2001 | Vigarie | 380/210 |
| 6,480,748 B1 | 11/2002 | Gerszberg et al. | |
| 6,487,722 B1 * | 11/2002 | Okura et al. | 725/40 |
| 7,207,055 B1 * | 4/2007 | Hendricks et al. | 725/95 |
| 7,669,223 B1 * | 2/2010 | Hendricks et al. | 725/116 |
| 7,848,520 B2 * | 12/2010 | Candelore et al. | 380/200 |
| 2001/0029608 A1 * | 10/2001 | Nagashima et al. | 725/2 |
| 2002/0094084 A1 * | 7/2002 | Wasilewski et al. | 380/241 |
| 2002/0144279 A1 | 10/2002 | Zhou | |
| 2003/0108199 A1 * | 6/2003 | Pinder et al. | 380/200 |
| 2004/0148634 A1 * | 7/2004 | Arsenault et al. | 725/89 |
| 2006/0294540 A1 * | 12/2006 | Perlman | 725/31 |
| 2008/0005760 A1 * | 1/2008 | Kay et al. | 725/1 |

FOREIGN PATENT DOCUMENTS

| | | |
|---|---|---|
| JP | 10214130 | 8/1998 |
| JP | 2001169265 | 6/2001 |
| JP | 2002532022 | 9/2002 |
| JP | 2002325243 | 11/2002 |
| KR | 0661172 | 12/2006 |
| KR | 0819620 | 4/2008 |
| WO | WO 97/24832 | 7/1997 |
| WO | WO9937092 | 7/1999 |
| WO | WO0033578 | 6/2000 |
| WO | WO 01/17242 | 3/2001 |
| WO | WO0199423 | 12/2001 |
| WO | WO02065705 | 8/2002 |
| WO | WO02084971 | 10/2002 |

OTHER PUBLICATIONS

Supplementary European Search Report Dated Mar. 27, 2008.

* cited by examiner

US 8,266,643 B2

METHOD AND SYSTEM FOR PREMIUM CHANNEL AND PAY PER VIEW VIDEO RESELL

This application claims the benefit, under 35 U.S.C. §365 of International Application PCT/US03/38213, filed Dec. 2, 2003, which was published in accordance with PCT Article 21(2) on Jun. 24, 2004 in English and which claims the benefit of U.S. provisional patent application No. 60/431,512, filed Dec. 6, 2002 and U.S. provisional patent application No. 60/431,276, filed Dec. 6, 2002.

FIELD OF THE INVENTION

The present invention relates generally to providing video services in a Multi-Dwelling or Multi-Tenant network. More specifically, the present invention relates to a method and system for premium channel and pay per view video resell.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Over the last few years, many multi-dwelling establishments, such as hotels, motels, and apartments, have begun to expand into the business of providing digital data signals, such as digital video or internet services, to their patrons. Besides providing higher quality video than older analog video systems, digital data systems provide the hotel or motel owner the flexibility to supply video-on demand, internet access, and pay-per-view video to each room over one connection. Further, because hotel and motel operators are also usually able to charge residents a premium for digital data services, an increasing number of multi-dwelling establishments are investing in digital data systems to increase profits.

Unfortunately, most modern digital data systems were designed for use in single family homes where billing options and program choices rarely change. They are not set up for the rapid customer changeover found in a multi-dwelling/hotel environment. Unlike a residential system, a multi-dwelling digital data system requires back-end billing and program management features that are designed to handle frequent changes in billing and programming options as each room changes hands.

SUMMARY OF THE INVENTION

The disclosed embodiments relate to a system and method for providing data in a multiple dwelling facility (16). The system (10) may comprise a headend unit (12) that receives a data stream that comprises a plurality of programs, and a multiple dwelling unit network (14) that is adapted to receive at least a portion of the data stream from the headend unit (12) and provide at least a subset of the plurality of programs to individual users in the multiple dwelling facility (16). The method may comprise the acts of receiving a data stream that comprises a plurality of programs, distributing at least a portion of the data stream to a multiple dwelling unit network (14), and providing access to a specific one of the plurality of programs to each of a plurality of individual users within the multiple dwelling facility (16) via the multiple dwelling up (14) depending on whether each of the plurality of individual users has met at least one predetermined condition.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
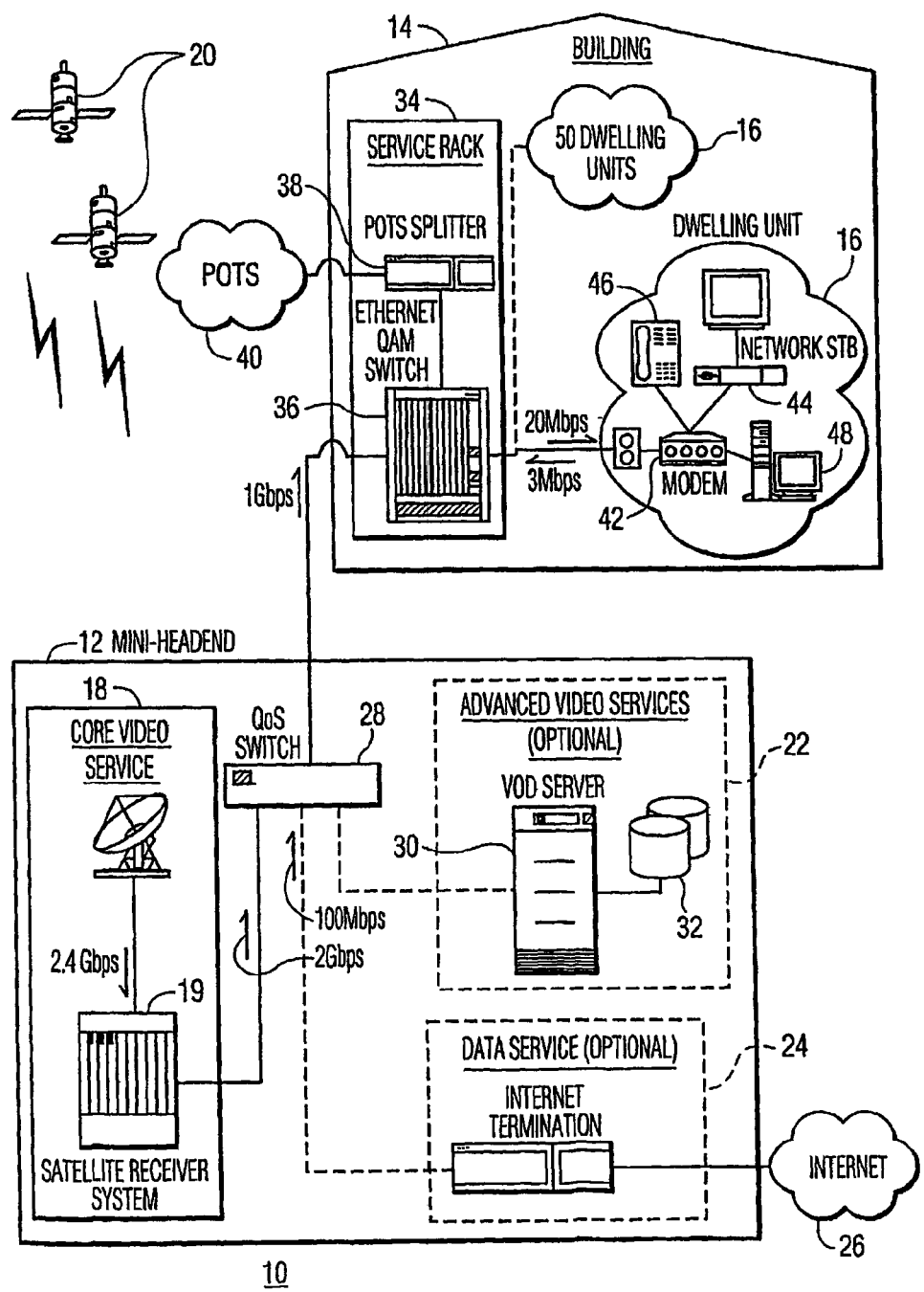
FIG. 1 is a block diagram of a digital data system adapted for use in a Multi-Dwelling Unit in accordance with embodiments of the present invention.

Turning now to the drawings and referring initially to FIG. 1, a block diagram of a digital data system adapted for use in a Multi-Dwelling Unit in accordance with embodiments of the present invention and designated using a reference numeral 10. The digital data system 10 is an integrated digital data system that may be adapted to provide broadband, digital video, and services to multiple users. An additional feature of the digital data system 10 is its ability to integrate quality audio and video with digital IP data services for multiple users. Further, the digital data system 10 is designed to provide a platform to launch a variety of cost effective digital services and is designed to be both scalable and to allow different digital data services to be added incrementally.

The digital data system 10 includes a Mini-Headend unit 12 where digital audio, video, and data services are received, aggregated together and distributed throughout a Multi-Dwelling Unit ("MxU") network 14, which may also be referred to as a Multi-Tenant Unit network. The MxU network 14 may be located in one or more apartment buildings, hotels, or any other structure where there are multiple clients desiring digital audio, video, or data services.

The Mini-Headend unit 12 is responsible for receiving data, providing Quality of Service ("QoS") in accordance with industry standards, providing customized services, and routing data to dwelling units 16 in the MxU network 14. A Core Video Service System 18, an Advanced Video Services System 22, a Data Service System 24 communicatively connected to the Internet 26, and a Gigabit QoS Ethernet Switch 28 may also be included in the Mini-Headend unit 12.

The Core Video Service System 18 preferably includes a Satellite Receiver System 19 that is communicatively coupled to one or more orbiting satellites 20. The Satellite Receiver System 19 is able to scale the number of streams received from the satellites 20 in accordance with how many clients request services. More specifically, in one embodiment, the Satellite Receiver System 19 runs a multi-cast server to allow a Network Set Top Box ("NSTB") 44 in the dwelling units 16 to request digital data streams. By scaling the number of tuning blades in the chassis up or down, the number of satellite transponders that the Satellite Receiver System 19 is able to receive can be adjusted. A fully-loaded chassis or the like can contain numerous transponders and may be able to handle an input data rate of 2.4 Gbps or higher. Once the satellite signals are received, the Satellite Receiver System 19 may be able to output IP packets to the Gigabit QoS Ethernet switch 28. These output IP packets conform to QoS specifications set forth in IEEE 802.1p (entitled "Traffic Class Expediting and Dynamic Multicast Filtering") and IEEE 802.1q (entitled "Virtual LANs"), which are incorporated by reference. The Satellite Receiver System 19 has a 1 Gbps Ethernet port which functions as a network interface. The network interface may be expanded to include another Ethernet port if desired. In addition, a management system that accepts requests for programs from the clients may also be included in the Satellite Receiver System 19. The management system can allow the user to select a satellite, transponder, and program IDs, which in turn could allow the Satellite Receiver System 19 to provide specific program streams to the user. The management system may also support multi-casting to save bandwidth. Although the Satellite Receiver System 19 and the satellites 20 are illustrated as the content delivery medium in FIG. 1, the use of other media (e.g., cable, fiber, etc.) for delivering content is considered within the scope of the invention.

The Advanced Video Services System 22 is a platform that works in conjunction with the Satellite Receiver System 19 to enable additional digital video services. Because it is scalable, the Advanced Video Services System 22 can be adjusted depending on the number of users that use the service. For example, the Advanced Video Services System 22 may require more servers 30 as the number of users increases. The types of services provided by the Advanced Video, Services System 22 may include Video On Demand, Near Video On Demand, Limited Video On Demand, Nielsen Ratings, Time Shift, Auto Record, Personal Video Recording ("PVR"), and the like. A Conditional Access System can also be used in conjunction with the Advanced Video system 22 for program streams that are recorded to hard drive(s) 32. When recording, the original program stream received from the Satellite Receiver System 19 is decrypted, picture data is extracted, and a new program stream (containing the extracted picture data) is encrypted and stored onto the hard drive 32. In this embodiment, the network provider's conditional access system is terminated at the Advanced Video System Server 30 and the new conditional access system is used thereafter.

The Data Service System 24 may be used to provide internet access to the MxU network 14. Amongst other features, the Data Service System 24 may have the ability to be scaled according to the number of clients using internet service and the required speed or bandwidth of the internet service.

As stated above, the Mini-Headend unit 12 may contain the Gigabit QoS Ethernet Switch 28 to provide connectivity between the Core Video Services System 18, the Advanced Video Services System 22, the Data Services System 24, and the MxU network 14. While the Gigabit QoS Ethernet Switch 28 is necessary for medium to large systems, it can be removed in small installations. The Gigabit QoS Ethernet Switch 28 supports full-duplex Gigabit Ethernet interfaces and is scalable to support systems of various sizes. The Gigabit QoS Ethernet Switch 28 may also support a QoS standard as set forth in the IEEE 802.1p and 802.1q standards. The QoS standard can facilitate communication between the Gigabit QoS Ethernet Switch 28, the Core Video Services System 18, the Advanced Video Services System 22, and the Data Services System 24 by giving a higher priority to video data than internet data from the Data Service System 24. For example, when video data and internet data are simultaneously requested, video data is transmitted first and the internet data is delayed until sufficient bandwidth becomes available. The type of services being provided and the number of dwelling units 16 that are in the MxU network 14 are a few of the many factors that one of ordinary skill in the art must consider in selecting the Gigabit QoS Ethernet Switch 28.

The MxU network 14 also can include one or more service racks 34. The service rack 34 is scalable according to the number of the dwelling units 16 in the MxU network 14. In the one embodiment of the invention, the service rack 34 is located where the phone lines in the MxU network 14 come together. The number of MxU networks 14 in the digital data system 10 dictates the number of the service racks 34 that are required. Preferably, a service rack 34 is provided for each of the MxU networks 14 (e.g., buildings) in a multi-network environment (e.g., a multiple building complex). Each of the service racks 34 may include a VDSL switch 36 that uses a Plain Old Telephone Service ("POTS") Splitter 38 to combine POTS service 40 with the digital video, audio, and data received from the Gigabit QoS Ethernet Switch 28 of the Mini-Headend 12. Although the VDSL switch 36 is illustrated as being an Ethernet Quadrature Amplitude Modulation ("QAM") switch, any other appropriate switch is considered within the scope of the present invention.

In the digital data system 10, each of the dwelling units 16 may include a modem 42, a NSTB 44, both the modem 42 and the NSTB 44, or an integrated modem and NSTB unit. One example of the NSTB 44 is a satellite (for example, DirecTV) set top box that has been configured to interface with the Mini-Headend unit 14. The modem 42 is one method by which the NSTB can access digital data, audio, and video services. The modem 42 can be connectable to the VDSL switch 36 via phone lines and can terminate the VDSL line. The modem 42 may also have a POTS Splitter and a connection for phone services 46. The modem 42 may also have an Ethernet port to provide one or more computers 48 access to the internet in addition to providing NSTB 44 access to audio, video, and data services.

Although phone lines are shown in FIG. 1, the communication medium between the dwelling units 16, the service rack 34, and the Mini-Headend unit 12, other appropriate forms of networking, including cable and wireless networks, are considered within the scope of the invention.

A Mini-Headend operator may choose to resell Pay Per View video or premium video channels over the digital data system 10. To accomplish this goal, the Mini-Headend operator may purchase a video programming package from a digital data provider, such as DirecTV. The video programming package permits the Core Video Services System 18 to receive premium video channels, such as HBO and the like, and pay per view video channels, which the Mini-Headend unit 12 can transmit to the MxU network 14.

In the operation of an embodiment that permits premium channel resale, the Mini-Headend unit 12 may be configured to resell a subset of the channels/programs in the video programming package based on the preferences of the Mini-Headend operator. Local purchase control is accomplished by layering an additional conditional access system on top of the underlying conditional access system (e.g., from a satellite provider). Thus, video viewing requires both conditional access systems to allow video presentation before the video can be seen. If the Mini-Headend unit 12 supports an on-screen program guide, the system can be configured to resell either entire video channels or specific individual programs from a video channel. In the operation of the Pay Per View video embodiment, the Mini-Headend unit 12 is configured to resell individual Pay Per View video programs.

The Mini-Headend unit 12 may also provide an interface to a billing system which can facilitate the billing of digital video and data purchases. In this embodiment, the MxU operator may be able to interface with the Mini-Headend unit 12 to immediately bill a particular purchased channel against the associated user account.

Figure 2:
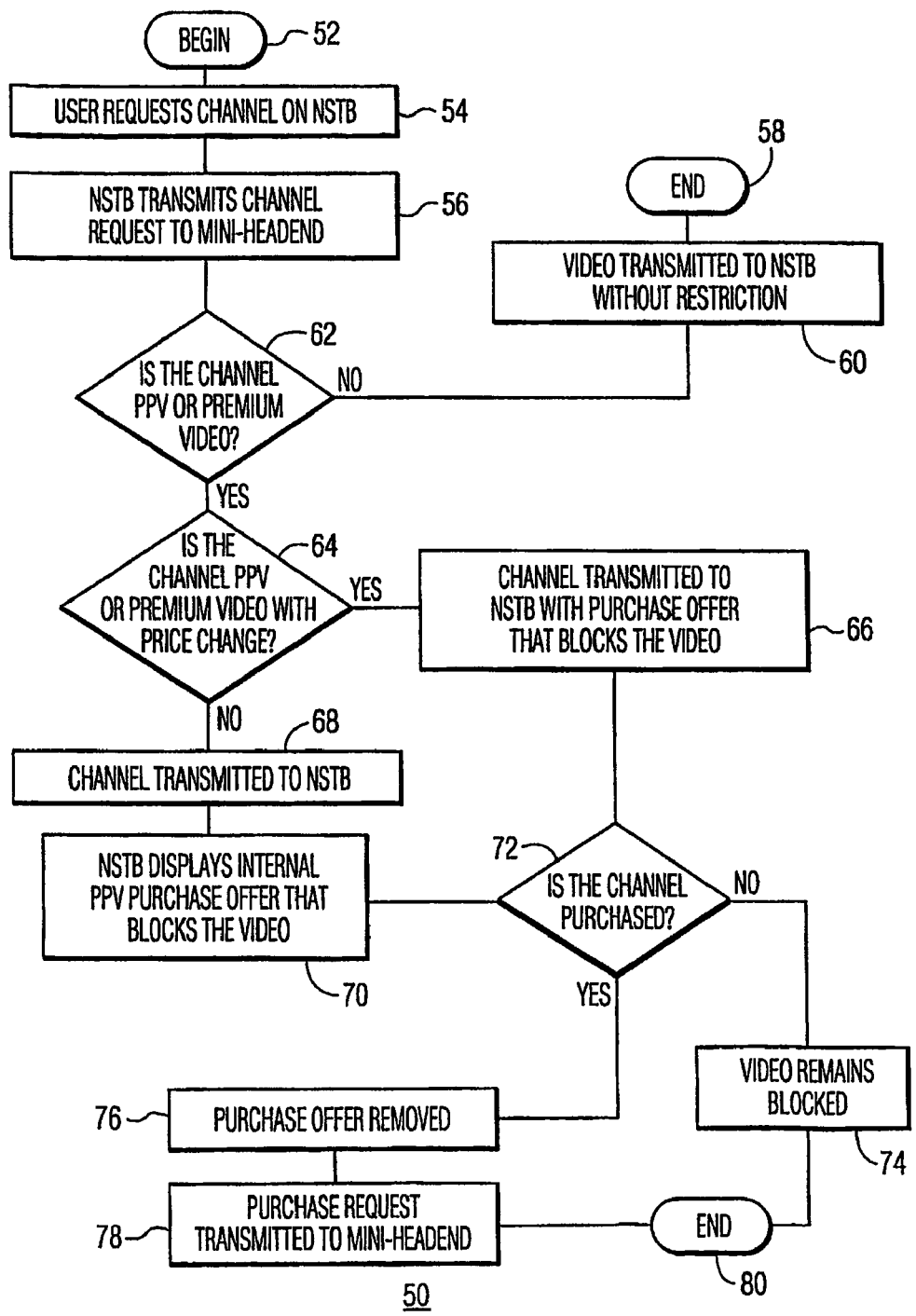
FIG. 2 is a process flow diagram showing the communication between a headend and a network set top box in accordance with embodiments of the present invention.

Turning now to FIG. 2, a block diagram of the communication between the Mini-Headend unit and a Network Set Top Box ("NSTB") in accordance with embodiments of the present invention and designated using a reference numeral 50. In block 54, the user requests a channel on the NSTB. This typically happens when a customer selects a channel on their television. In block 56, the NSTB forwards the channel request to the Mini-Headend. In block 62, the Mini-Headend unit processes the request and determines if the channel is a premium video reselling channel or a Pay Per View video channel. If the channel is not a premium video reselling channel or Pay Per View video channel, in block 60, the Mini-Headend unit transmits the requested channel back to the NSTB without restriction. This permits the user to watch the channel.

If the channel is a Pay Per View video channel and the Mini-Headend unit operator does not wish to alter the digital data provider's price for the channel, the channel is forwarded back to NSTB without any additional restrictions in block 68. In this case, in block 70, the NSTB's internal system for selling Pay Per View video will block the video with a purchase offer until the user agrees to purchase the video. If the user agrees to purchase the video, the purchase offer is removed in block 76 and a signal is sent to the Mini-Headend unit with the purchase request in block 78. If the user does not purchase the channel, in block 74, the video remains blocked by the purchase offer.

If the channel is a premium video reselling channel or a Pay Per View video channel for which the Mini-Headend operator wishes to modify the price, the video is forwarded to the NSTB along with a purchase offer in block 66. In this embodiment, the purchase offer price is set by the Mini-Headend unit operator. When the NSTB receives the purchase offer, it displays the purchase offer instead of the requested channel. One method of doing this is to replace the premium channel or Pay Per View channel video with an On Screen Display ("OSD"). The purchase offer replaces the video and informs the user that the channel is available for purchase. The user then has the option of purchasing the channel in block 72. If the user agrees to purchase the video, the purchase offer is removed in block 76 and a signal is transmitted to the Mini-Headend unit with the purchase request in block 78. The purchase offer can be set to remain removed even if the user changes channels and then returns to the purchased channel. If the user does not purchase the channel, in block 74, the video remains blocked by the purchase offer.

In an alternate embodiment of the invention, the NSTB is pre-programmed with the pricing information for the premium video reselling channel or the Pay Per View video channel. In this embodiment, the NSTB is configured to display the purchase offer without communicating with the Mini-Headend unit. After a purchase, the NSTB removes the purchase offer, displays the purchased channel, and transmits the purchase request information to the Mini-Headend unit.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A system for providing data in a multiple dwelling facility, the system comprising:
    a headend unit that receives a data stream processed for use with a first conditional access system from a program provider via a content delivery medium, the data stream comprising a plurality of programs; and
    a multiple dwelling unit network that is adapted to receive at least a portion of the data stream from the headend unit and provide at least a subset of the plurality of programs to individual users in the multiple dwelling facility;
    wherein the headend unit determines whether to price at least one of the plurality of programs to individual users in the multiple dwelling facility at either a first-non-zero price for viewing the entire program set by the program provider where the at least one program is provided using said first conditional access system or at a second non-zero price for viewing the entire program set by the headend unit where the at least one program is provided using the first conditional access system and a second conditional access system, wherein said second conditional access system is used by the headend unit responsive to the determination that said second non-zero price for viewing the entire program should be applied.

2. The system set forth in claim 1, wherein the multiple dwelling unit network comprises a switch that distributes the at least a subset of the plurality of programs to users in individual dwelling units within the multiple dwelling facility.

3. The system set forth in claim 1, wherein the multiple dwelling unit network comprises a set top box in each of the individual dwelling units within the multiple dwelling facility, each of the set top boxes being adapted to block a specific program or permit access to the specific program depending on whether a user has met at least one predetermined condition.

4. The system set forth in claim 1, wherein at least one of the plurality of programs comprises a premium video channel.

5. The system set forth in claim 1, wherein at least one of the plurality of programs comprises a pay per view video program.

6. The system set forth in claim 1, wherein the headend unit is configured to interface with a billing system that is configured to create a billing record for each of a plurality of users in the multiple dwelling facility.

7. A method for providing access to data to individual users within a multiple dwelling facility, comprising the acts of:
    receiving a data stream processed for use with a first conditional access system from a program provider via a content delivery medium, the data stream comprising a plurality of programs;
    distributing at least a portion of the data stream to a multiple dwelling unit network; and
    providing access to a specific one of the plurality of programs to each of a plurality of individual users within the multiple dwelling facility via the multiple dwelling unit network depending on whether each of the plurality of individual users has met at least one predetermined condition, wherein a headend unit determines whether to price the specific one of the plurality of programs is provided either at a first non-zero price for viewing the entire program set by the program provider where the access to the program is provided using said first conditional access system or at a second non-zero price for viewing the entire program set by the headend unit where the access to the program is provided using the first conditional access system and a second conditional access system, wherein said second conditional access system is used responsive to a determination that said second non-zero price for viewing the entire program should be applied.

8. The method set forth in claim 7, comprising the act of providing a pay per view video program as at least one of the plurality of programs.

9. The method set forth in claim 7, comprising the act of providing a premium video channel as at least one of the plurality of programs.

10. The method set forth in claim 7, wherein the at least one predetermined condition comprises selecting at least one of the plurality of programs for display using an on-screen programming guide.

11. The method set forth in claim 7, comprising the act of blocking access by at least one of the plurality of individual users to the specific one of the plurality of programs until the at least one of the predetermined users has met the at least one predetermined condition.

12. The method set forth in claim 7, comprising the act of providing an on screen display in place of at least one of the plurality of programs.

13. A system for providing data in a multiple dwelling facility, the system comprising:

means for receiving a data stream processed for use with a first conditional access system from a program provider via a content delivery medium, the data stream comprising a plurality of programs, the means for receiving the data stream determining whether to price at least one of the plurality of programs to individual users in the multiple dwelling facility either at a first non-zero price for viewing the entire program set by the program provider or at a second non-zero price for viewing the entire program set by the means for receiving the data stream; and means for providing at least a subset of the plurality of programs to individual users in the multiple dwelling facility, where the at least one program is provided using a first conditional access system when the at least one program is offered at the first non-zero price for viewing the entire program and where the at least one program is provided using the first conditional access system and a second conditional access system when the at least one program is offered at the second non-zero price for viewing the entire program, wherein said second conditional access system is used responsive to a determination that said second non-zero price for viewing the entire program should be applied.

14. The system set forth in claim 13, wherein the means for providing at least a subset of the plurality of programs to individual users in the multiple dwelling facility comprises a switch that distributes the at least a subset of the plurality of programs to users in individual dwelling units within the multiple dwelling facility.

15. The system set forth in claim 13, wherein the means for providing at least a subset of the plurality of programs to individual users in the multiple dwelling facility comprises a set top box in each of the individual dwelling units within the multiple dwelling facility, each of the set top boxes being adapted to block a specific program or permit access to the specific program depending on whether a user has met at least one predetermined condition.

16. The system set forth in claim 13, wherein at least one of the plurality of programs comprises a premium video channel.

17. The system set forth in claim 13, wherein at least one of the plurality of programs comprises a pay per view video program.

18. The system set forth in claim 13, wherein the means for receiving a data stream is configured to interface with a billing system that is configured to create a billing record for each of a plurality of users in the multiple dwelling facility.

* * * * *